United States Patent
Byeon et al.

(10) Patent No.: US 8,848,344 B2
(45) Date of Patent: Sep. 30, 2014

(54) SOLID INSULATED SWITCHGEAR

(75) Inventors: Jeong Mu Byeon, Gangneung-Si (KR); Jae Gul Lee, Anseong-Si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 278 days.

(21) Appl. No.: 13/568,006

(22) Filed: Aug. 6, 2012

(65) Prior Publication Data

US 2013/0044407 A1    Feb. 21, 2013

(30) Foreign Application Priority Data

Aug. 16, 2011   (KR) ........................ 10-2011-0081257

(51) Int. Cl.
| | | |
|---|---|---|
| H02B 1/20 | (2006.01) | |
| H02B 1/26 | (2006.01) | |
| H01H 33/02 | (2006.01) | |
| H01H 9/26 | (2006.01) | |
| H02B 13/01 | (2006.01) | |
| H01H 33/52 | (2006.01) | |
| H01H 33/56 | (2006.01) | |
| H02B 13/00 | (2006.01) | |

(52) U.S. Cl.
CPC ....... *H01H 33/022* (2013.01); *H01H 2033/566* (2013.01); *H02B 1/20* (2013.01); *H01H 33/021* (2013.01); *H01H 9/26* (2013.01); *H01H 33/56* (2013.01); *H02B 13/01* (2013.01); *H01H 33/52* (2013.01); *H02B 13/005* (2013.01)
USPC ........... 361/611; 361/614; 361/622; 361/624; 361/641; 361/643; 361/648; 361/652

(58) Field of Classification Search
None
See application file for complete search history.

(56) References Cited

U.S. PATENT DOCUMENTS

| | | | | |
|---|---|---|---|---|
| 1,991,229 A | * | 2/1935 | Lynn | ............................... 338/92 |
| 8,237,407 B2 | * | 8/2012 | Hurst et al. | ................... 320/128 |

FOREIGN PATENT DOCUMENTS

| | | |
|---|---|---|
| FR | 1365613 | 7/1964 |
| GB | 565877 | 12/1944 |
| JP | 2006-180615 | 7/2006 |

OTHER PUBLICATIONS

European Patent Office Application Serial No. 12177464.0, Search Report dated Oct. 8, 2013, 5 pages.

* cited by examiner

*Primary Examiner* — Boris Chervinsky
(74) *Attorney, Agent, or Firm* — Lee, Hong, Degerman, Kang & Waimey

(57) ABSTRACT

A solid insulated switchgear having at least one circuit switches for switching a three-pole AC circuit includes a plurality of bus-bars for pole. Each of the bus-bars for pole being providing correspondingly for each pole comprises a ring-shaped bus-bar portion electrically connecting the arc extinguishing mechanisms for the same pole, and each having an internal electrical conductor portion and an external solid insulated mold portion in which the conductor portion is built; and a plurality of extended connecting portions respectively extended from the ring-shaped bus-bar portion while being space apart from one another in a circumferential direction so that the plurality of circuit switches are connected in the state in which the plurality of circuit switches are separated from one another.

12 Claims, 7 Drawing Sheets

SOLID INSULATED SWITCHGEAR

CROSS-REFERENCE TO RELATED APPLICATION

Pursuant to 35 U.S.C. §119(a), this application claims the benefit of earlier filing date and right of priority to Korean Application No. 10-2011-0081257, filed on Aug. 16, 2011, the contents of which is incorporated by reference herein in its entirety.

BACKGROUND OF THE INVENTION

1. Field of the Invention

The present disclosure relates to a solid insulated switchgear, and particularly, to a solid insulated switchgear capable of removing a fault or useless circuit, easily adding a new circuit and performing maintenance/repair, and decreasing an area occupied in the horizontal direction.

2. Background of the Invention

A switchgear is a device called as a load break switch, which is used to divide and branch electrical power lines of an electrical power circuit, through which electrical power is supplied from an underground electrical power line among electrical power distribution lines to power consumption houses on the ground, and to switch (open or close) electrical loads. The switchgear is configured to include at least one circuit switch so as to branch the electrical power supplied through the underground electrical power line to a plurality of load-side circuits.

A gas insulated switchgear (called as a gas insulated load break switch) in which contact mechanisms of movable and stationary contactors for switching a circuit are installed in a tank having an insulation gas filled therein has been frequently used as the switchgear.

However, since sulfur hexafluoride (SF6) used as the insulation gas is pointed out as a main cause of global warming, the use of the SF6 is restricted. Accordingly, a solid insulated switchgear in which a contact mechanism for each pole is embedded in a solid insulator so as to guarantee the electrical insulation between the poles has recently been developed, and the use of the solid insulated switchgear has been internationally spread.

The present disclosure relates to a solid insulated switchgear. The gazette of Korean Patent Laid-open Publication No. 10-2010-0007231 (entitled by "Switching Mechanism of Solid Insulated Switchgear"), filed by the present applicant and published, can be referred to as an example of a related art in the solid insulated switchgear, and will be described with reference to FIG. 1 extracted from the drawings of the gazette.

As can be seen with reference to FIG. 1, the solid insulated switchgear according to the example of the related art includes a control console 100, a battery 90, an actuator 130, a power transmission mechanism 160, a plurality of switching mechanisms 160, bus-bars 20, a potential transformer 30, a connector 40 and ground bus bars 50. Here, a portion including the actuator 130, the power transmission mechanism 150 and the switching mechanism 160, which can simultaneously switch an AC 3-poles circuits, is called as a circuit switch.

The control console 100 is a functional portion for electronic control, which includes an electronic circuit portion for performing a switching control of the solid insulated switchgear and a communication portion for performing a remote control.

The battery 90 is a unit for supplying DC power stored therein to the control console 100.

The actuator 130 is a power source that provides power for performing switching driving of the switching mechanism 160. The actuator 130 may generate manual power by connecting a manual actuating handle thereto, and may generate electric power through electric actuation by being connected to an electric motor. The detailed configuration and operation of the actuator 130 can be referred to in Korean Patent No. 566435 filed by the present applicant on Sep. 30, 2003, and registered on Mar. 24, 2006.

The power transmission mechanism 150 is a component for transmitting a switching driving force from the actuator 130 to the switching mechanism 160, and includes a power transmission shaft and a link mechanism for converting rotary power transmitted by the power transmission shaft into vertical power for contact switching of the switching mechanism 160. The detailed configuration and operation of the power transmission mechanism 150 can be referred to in Korean Patent Laid-open Publication No. 10-2010-0007231, and therefore, its description will be omitted.

Each of the switching mechanism 160 is a portion called as an arc extinguishing mechanism, and includes a vacuum interrupter having movable contact and stationary contact built therein, a rod for connecting the movable contact to the link mechanism, a portion for connection of an external circuit, and a solid insulated mold casing for accommodating all the portions to be electrically insulated. The detailed configuration and operation of the switching mechanism 160 can be referred to in Korean Patent Laid-open Publication No. 10-2010-0007231, and therefore, its description will be omitted.

The bus-bar 20 is a conductor bar that is connected to the stationary contact of the switching mechanism and connects the stationary contacts for each pole. The stationary contacts for the same pole in each of the switching mechanisms 160 are connected to one another by the bus-bar 20. In one solid insulated switchgear, the actuator 130, as shown in FIG. 1, may be provided with four actuators, i.e., one actuator for main circuit and three actuators for branch circuit, and three switching mechanisms 160 may be provided to respectively correspond to three poles for each of the actuators 130. Therefore, the bus-bar 20 may be provided with three bus-bars corresponding to three switching mechanisms 160 for each of the four actuators 130. The detailed configuration and operation of the bus-bar 20 can be referred to in Korean Patent No. 0789446 filed by the present applicant on Dec. 6, 2006 (Filing No.: 10-2006-0123348), and registered on Dec. 28, 2007.

The potential transformer 30 is a unit for transforming AC of any one pole (single pole) in the bus-bar 20 into DC and providing the transformed DC to the control console 100 and the battery 90. For example, the potential transformer 30 may include a rectifier having a rectifying circuit for converting AC into DC, a capacitor for smoothing a rectified voltage, etc.

The connector 40 is an electrical connector for electrically connecting the bus-bar 20 of the one pole (single pole) and the potential transformer 30.

The ground bus bar 50 is a unit connected between the vacuum interrupter for earthing and the ground so as to connect the vacuum interrupter for earthing in the switching mechanism 160 to the ground. For example, the ground bus bars 50 may be connected to the vacuum interrupter and the ground through a conducting wire and a ground rod, respectively.

The solid insulated switchgear according to the example of the related art configured as described above has four actuators (four circuit switches) and three pole switching mechanisms for each of the corresponding actuators. Hence, when the solid insulated switchgear is installed at power consumption houses, there may exist a plurality of circuit switches for branch circuit, which are not used among the four circuit switches. Therefore, many wasteful factors exist in terms of use efficiency as compared with installation cost of one solid insulated switchgear.

Further, the solid insulated switchgear according to the example of the related art configured as described above has a horizontal arrangement structure of four actuator (four circuits) and three switching mechanisms for each of the corresponding actuators, and accordingly, the bus-bar connected to the switching mechanisms also has a structure extended in the horizontal direction. Therefore, the solid insulated switchgear has a drawback that occupies a wide area in the horizontal direction.

SUMMARY OF THE INVENTION

Therefore, an aspect of the detailed description is to provide a solid insulated switchgear, and particularly, to a solid insulated switchgear capable of removing a fault or useless circuit, simply adding a new circuit and performing easy maintenance/repair, and decreasing an area occupied in the horizontal direction.

To achieve these and other advantages and in accordance with the purpose of this disclosure, as embodied and broadly described herein, a solid insulated switchgear having at least one circuit switch for opening or closing a three-poles Alternating Current circuits, comprising:

a plurality of bus-bars for pole, each of the bus-bars for pole being providing correspondingly for each pole comprises:

a ring-shaped bus-bar portion having an internal electrical conductor portion and an external solid insulated mold portion in which the conductor portion is built, and the ring-shaped bus-bar portions provided correspondingly to each pole of three AC poles; and a plurality of extended connecting portions respectively extended from the ring-shaped bus-bar portion while being space apart from one another in a circumferential direction so that the plurality of circuit switches are connected in the state in which the plurality of circuit switches are separated from one another.

According to a preferred aspect of the present disclosure, the circuit switches may be arranged along the circumference of the ring-shaped bus-bar portion above the bus-bars for pole.

According to another preferred aspect of the present disclosure, the plurality of bus-bars for pole comprise:

a first bus-bar for pole having a first ring-shaped bus-bar portion and a plurality of first extended connecting portions extended downward from the first ring-shaped bus-bar portion and spaced apart from one another in the circumferential direction, and providing a conducting path of a first pole of the AC three poles;

a second bus-bar for pole having a second ring-shaped bus-bar portion and a plurality of second extended connecting portions extended horizontally from the second ring-shaped bus-bar portion and spaced apart from one another in the circumferential direction, arranged lower than the first bus-bar for pole, and providing a conducting path of a second pole of the AC three poles; and a third bus-bar for pole having a third ring-shaped bus-bar portion and a plurality of third extended connecting portions extended upward from the third ring-shaped bus-bar portion and spaced apart from one another in the circumferential direction, arranged lower than the second bus-bar for pole, and providing a conducting path of a third pole of the AC three poles.

According to still another preferred aspect of the present disclosure, the first bus-bar for pole further comprises a plurality of first vertical connecting portions extended vertically from the first extended connecting portions so as to be connected to the plurality of circuit switches, the second bus-bar for pole further comprises a plurality of second vertical connecting portions extended vertically from the second extended connecting portions so as to be connected to the plurality of circuit switches, and the third bus-bar for pole further comprises a plurality of third vertical connecting portions extended vertically from the third extended connecting portions so as to be connected to the plurality of circuit switches.

According to still another preferred aspect of the present disclosure, the first, second and third connecting portions are arranged so that the heights of their top ends are identical to one another and the heights of their bottom ends are identical to one another.

According to still another preferred aspect of the present disclosure, the solid insulated switchgear may further comprise a plurality of horizontal support frames and a plurality of vertical support frames connectable to or separable from each other by fastening unit so as to support the circuit switches.

According to still another preferred aspect of the present disclosure, the plurality of bus-bars for pole are arranged to have concentricity.

According to still another preferred aspect of the present disclosure, the solid insulated switchgear may further comprise an enclosure surrounding at least one of the circuit switches and the plurality of bus-bars for pole.

According to still another preferred aspect of the present disclosure, the enclosure comprises:

a plurality of connection panels of which positions are fixed; and a plurality of door panels each arranged at an opening/closing position so as to be rotatably connected by a hinge to any one of the connection panels respectively disposed in front of the circuit switches, so that the corresponding circuit switch is accessed through the corresponding door panel.

According to still another preferred aspect of the present disclosure, a solid insulated switchgear having at least one circuit switch comprising a plurality of arc extinguishing mechanism, each provided for each pole of AC three poles so as to be embedded in a solid insulating material and each having a vacuum interrupter with stationary and movable contact portions, a three-pole common actuator providing a driving force so as to open/close the arc extinguishing mechanisms, and a power transmission mechanism transmitting the driving force of the actuator to the movable contact portions of the arc extinguishing mechanisms, the solid insulated switchgear comprising:

a plurality of bus-bars for pole, each of the bus-bars for pole being providing correspondingly for each pole comprises:

a ring-shaped bus-bar portion electrically connecting the arc extinguishing mechanisms for the same pole, and each having an internal electrical conductor portion and an external solid insulated mold portion in which the conductor portion is built; and a plurality of extended connecting portions respectively extended from the ring-shaped bus-bar portion while being space apart from one another in a circumferential direction so that the plurality of circuit switches are connected in the state in which the plurality of circuit switches are separated from one another.

According to still another preferred aspect of the present disclosure, the plurality of bus-bars for pole comprise:

a first bus-bar for pole having a first ring-shaped bus-bar portion and a plurality of first extended connecting portions extended downward from the first ring-shaped bus-bar portion and spaced apart from one another in the circumferential direction, and providing a conducting path of a first pole of the AC three poles;

a second bus-bar for pole having a second ring-shaped bus-bar portion and a plurality of second extended connecting portions extended horizontally from the second ring-shaped bus-bar portion and spaced apart from one another in the circumferential direction, arranged lower than the first bus-bar for pole, and providing a conducting path of a second pole of the AC three poles; and a third bus-bar for pole having a third ring-shaped bus-bar portion and a plurality of third extended connecting portions extended upward from the third ring-shaped bus-bar portion and spaced apart from one another in the circumferential direction, arranged lower than the second bus-bar for pole, and providing a conducting path of a third pole of the AC three poles.

According to still another preferred aspect of the present disclosure, the first bus-bar for pole further comprises a plurality of first vertical connecting portions extended vertically from the first extended connecting portions so as to be connected to the plurality of circuit switches, the second bus-bar for pole further comprises a plurality of second vertical connecting portions extended vertically from the second extended connecting portions so as to be connected to the plurality of circuit switches, and the third bus-bar for pole further comprises a plurality of third vertical connecting portions extended vertically from the third extended connecting portions so as to be connected to the plurality of circuit switches.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate preferred embodiments and together with the description serve to explain the principles of the invention.

In the drawings.

DETAILED DESCRIPTION OF THE INVENTION

Description will now be given in detail of the preferred embodiments, with reference to the accompanying drawings. For the sake of brief description with reference to the drawings, the same or equivalent components will be provided with the same reference numbers, and description thereof will not be repeated.

Figure 1:
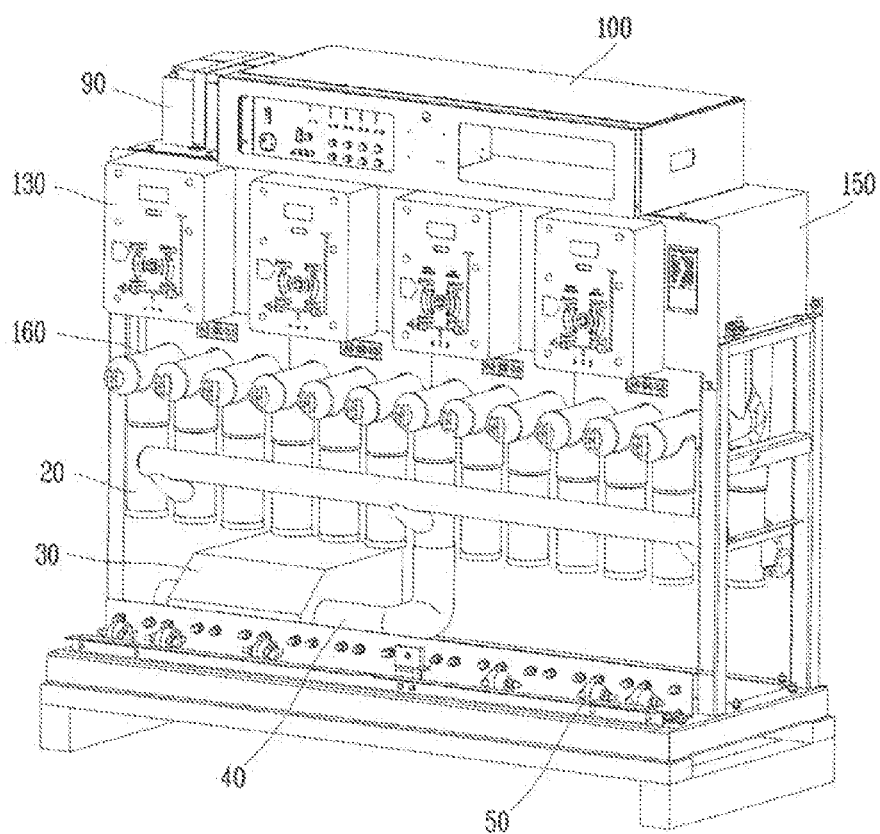
FIG. 1 is a perspective view showing a configuration of a solid insulated switchgear according to an example of a related art.
Figure 2:
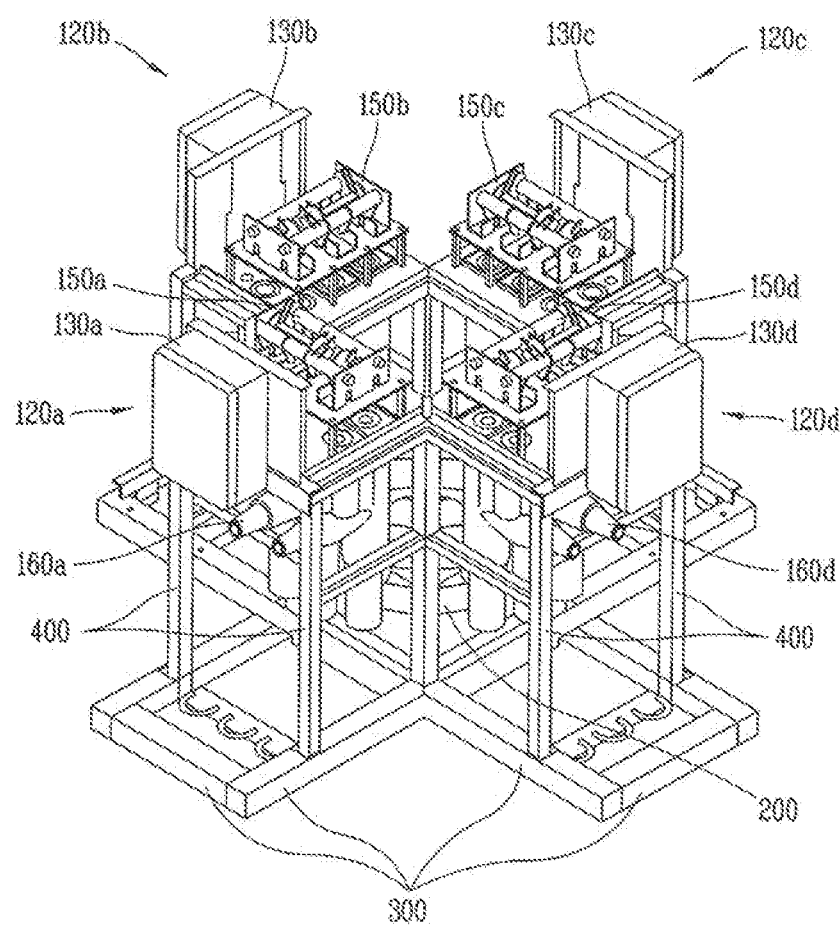
FIG. 2 is a perspective view showing an external configuration of a solid insulated switchgear in the state in which an enclosure is removed according to a preferred embodiment of the present invention.

As can be seen in FIG. 2, a solid insulated switchgear according to a preferred embodiment of the present invention has at least one circuit switch capable of switching (in other words closing or opening) a three-poles AC circuits. That is, in the preferred embodiment of FIG. 2, the solid insulated switchgear has four circuit switches 120a, 120b, 120c and 120d. Unlike the preferred embodiment shown in FIG. 2, an preferred embodiment in which a solid insulated switchgear is configured with only one, two or three of the four circuit switches 120a, 120b, 120c and 120d may be easily configured.

First, an external configuration of the solid insulated switchgear according to the preferred embodiment will be briefly described with reference to FIG. 2.

The solid insulated switchgear according to the preferred embodiment includes the four circuit switches 120a, 120b, 120c and 120d, a bus-bar for pole 200, a plurality of horizontal support frames 300 and a plurality of vertical support frames 400.

The four circuit switches 120a, 120b, 120c and 120d include a first circuit switch 120a, a second circuit switch 120b, a third circuit switch 120c and a fourth circuit switch 120d.

The first circuit switch 120a, the second circuit switch 120b, the third circuit switch 120c and the fourth circuit switch 120d are arranged above the bus-bar for pole 200 along the surroundings of a first ring-shaped bus-bar portion 200a-1, a second ring-shaped bus-bar portion 200b-1 and a third ring-shaped bus-bar portion 200c-1, which will be described later.

The first circuit switch 120a includes a first actuator 130a, a first power transmission mechanism 150a and a first switching mechanism 160a.

The first actuator 130a is a power source that provides power for switching driving of the first switching mechanism 160a as described in the background of the invention. The first actuator 130a may generate manual power by connecting a handle thereto, and may generate electric power through electric actuation by being connected to a motor. The detailed configuration and operation of the actuator 130 can be referred to in Korean Patent No. 566435 filed by the present applicant on Sep. 30, 2003, and registered on Mar. 24, 2006.

The first power transmission mechanism 150a is a component for transmitting a switching driving force from the first actuator 130a to the first switching mechanism 160a as described in the background of the invention, and includes a power transmission shaft and a link mechanism for converting rotary power transmitted by the power transmission shaft into vertical power for contact switching of the switching mechanism 160. The detailed configuration and operation of the first power transmission mechanism 150 can be referred to in Korean Patent Laid-open Publication No. 10-2010-0007231, and therefore, its description will be omitted.

The first switching mechanism 160a is a portion called as an arc extinguishing mechanism as described in the background of the invention. The first switching mechanism 160a includes a vacuum interrupter, a rod, a front bushing portion, a lower bushing portion and a solid insulating material, i.e., a solid insulated mold.

Here, the vacuum interrupter is provided for each pole of AC three poles so as to be embedded in a solid insulating material, and has movable contact and stationary contact.

The rod connects the movable contact to the link mechanism.

The front bushing portion is extended forward to be connected to an external electrical circuit (for example an external cable) and has a connection socket.

The lower bushing portion is extended downward to be connected to the bus-bar for pole 200 and has a connection socket.

The solid insulated mold accommodates all the portions to be electrically insulated. The detailed configuration and operation of the switching mechanism 160 can be referred to in Korean Patent Laid-open Publication No. 10-2010-0007231, and therefore, its description will be omitted.

The second circuit switch 120b includes a second actuator 130b, a second power transmission mechanism 150b and a second switching mechanism 160b. The configuration of the second actuator 130b, the second power transmission mechanism 150b and the second switching mechanism 160b is identical to that of the first actuator 130a, the first power transmission mechanism 150a and the first switching mechanism 160a, and can be described with reference to the aforementioned configuration. Therefore, its detailed description will be omitted to avoid redundancy.

The third circuit switch 120c includes a third actuator 130c, a third power transmission mechanism 150c and a third switching mechanism 160c. The configuration of the third actuator 130c, the third power transmission mechanism 150c and the third switching mechanism 160c is identical to that of the first actuator 130a, the first power transmission mechanism 150a and the first switching mechanism 160a, and can be described with reference to the aforementioned configuration. Therefore, its detailed description will be omitted to avoid redundancy.

The fourth circuit switch 120d includes a fourth actuator 130d, a fourth power transmission mechanism 150d and a fourth switching mechanism 160d. The configuration of the fourth actuator 130d, the fourth power transmission mechanism 150d and the fourth switching mechanism 160d is identical to that of the first actuator 130a, the first power transmission mechanism 150a and the first switching mechanism 160a, and can be described with reference to the aforementioned configuration. Therefore, its detailed description will be omitted to avoid redundancy.

The bus-bar for pole 200 is a unit that electrically connects switching mechanisms for the same pole with respect to the four circuit switches 120a, 120b, 120c and 120d. The bus-bar for pole 200 has a configuration in which its outside is molded with an electrical insulating material for the purpose of insulation between poles (AC three poles of R, S and T), and an electrical conduction portion is provided in the inside of the bus-bar for pole 200.

Hereinafter, the detailed configuration and operation of the bus-bar for pole 200 will be described with reference to FIGS. 3 to 7 and 9.

Figure 3:
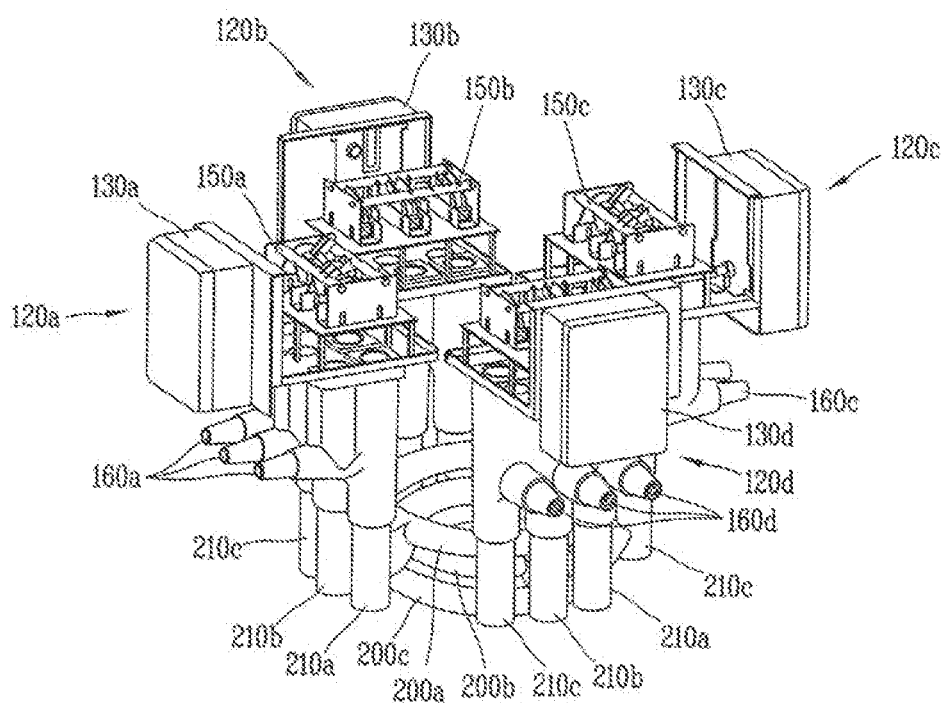
FIG. 3 is a perspective view showing a state in which only four circuit switches and a plurality of bus-bars for pole are connected to each other in the solid insulated switchgear having a support frame removed therefrom according to the preferred embodiment of this invention.
Figure 4:
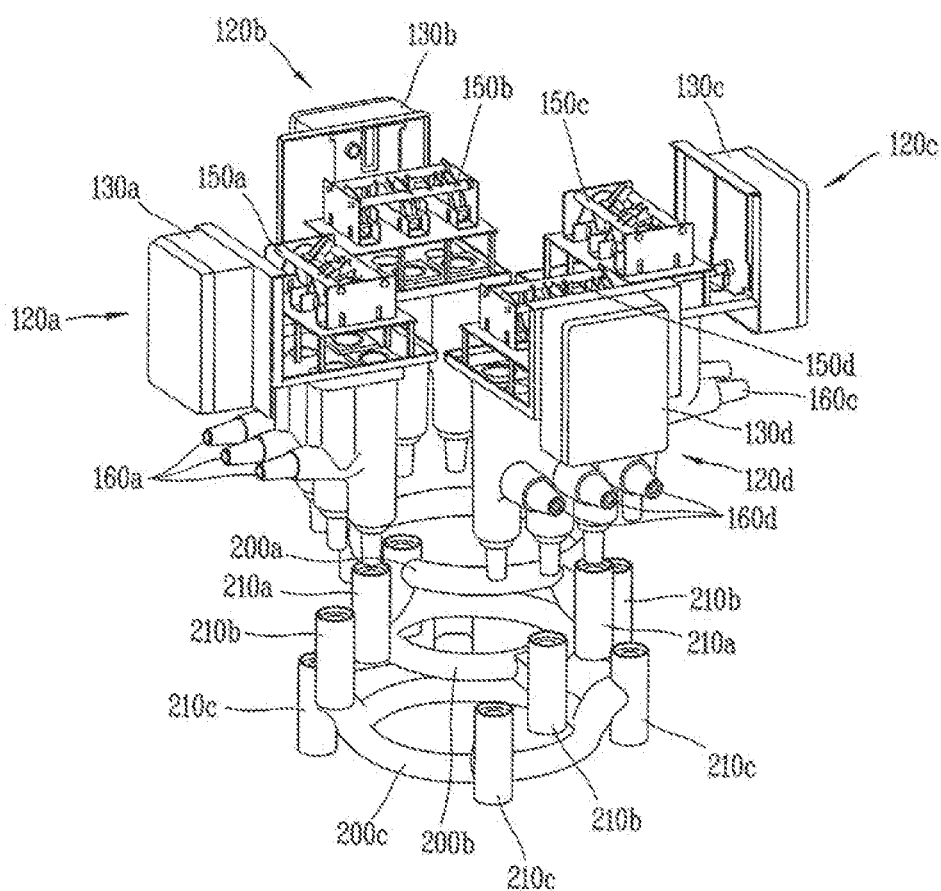
FIG. 4 is a perspective view showing a process in which the four circuit switches and three bus-bars for pole are assembled in the solid insulated switchgear having the support frame removed therefrom according to the preferred embodiment of this invention.

As can be seen in FIGS. 3 and 4, a plurality of bus-bars for pole 200 according to an preferred embodiment of the present disclosure are provided correspondingly to the AC three poles, and three bus-bars for pole 200 are provided in the solid insulated switchgear according to the preferred embodiment of the present disclosure.

As can be seen in FIGS. 3 to 7, the bus-bar for pole 200 includes three bus-bars for pole, i.e., a first bus-bar for pole 200a, a second bus-bar for pole 200b and a third bus-bar for pole 200c, correspondingly to AC three poles.

The first bus-bar for pole 200a, the second bus-bar for pole 200b and the third bus-bar for pole 200c are arranged to have concentricity.

Figure 5:
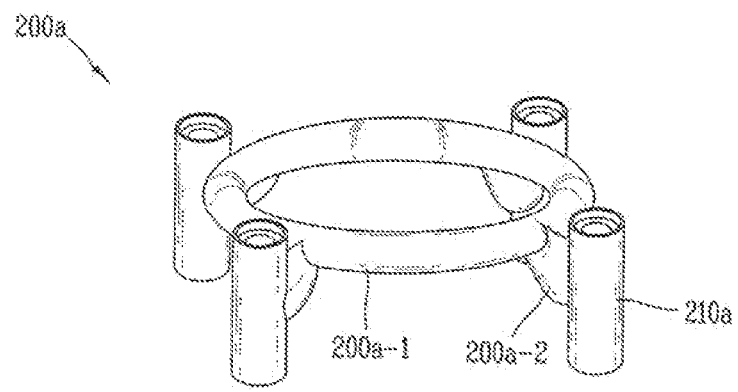
FIG. 5 is a perspective view showing a configuration of a first bus-bar for pole only in the bus-bars for pole of the solid insulated switchgear according to the preferred embodiment of this invention.

The first bus-bar for pole 200 includes a first ring-shaped bus-bar portion 200a-1 and a plurality of first extended connecting portions 200a-2, and provides an conducting path of a first pole of the AC three poles (e.g., an R pole of R, S and T poles). As can be seen in FIG. 5 according to the preferred embodiment, the first ring-shaped bus-bar portion 200a-1 is arranged in a lay-down position as a single body, and the first extended connecting portions 200a-2 includes four first extended connecting portions 200a-2 extended downward from the first ring-shaped bus-bar portion 200a-1 while being spaced apart from one another by 90 degrees.

The first bus-bar for pole 200a, as can be seen in FIG. 5, further includes four first vertical connecting portions 210a respectively extended in vertical directions from the first extended connecting portions 200a-2 so as to be connected to the first circuit switch 120a, the second circuit switch 120b, the third circuit switch 120c and the fourth circuit switch 120d.

Figure 6:
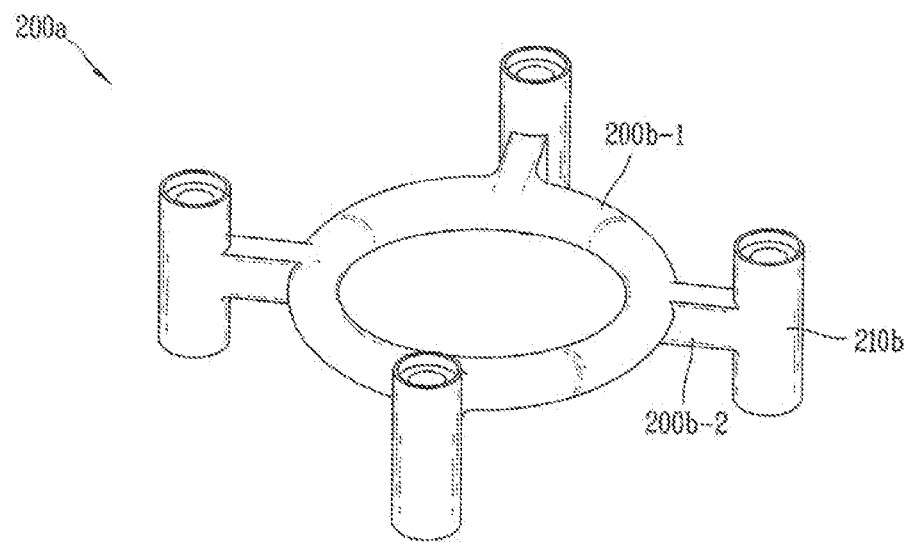
FIG. 6 is a perspective view showing a configuration of a second bus-bar for pole only in the bus-bars for pole of the solid insulated switchgear according to the preferred embodiment of this invention.

The second bus-bar for pole 200b includes a second ring-shaped bus-bar portion 200b-1 and a plurality of second extended connecting portions 200b-2, and provides an conducting path of a second pole of the AC three poles (e.g., an S pole of R, S and T poles). As can be seen in FIG. 6 according to an preferred embodiment, the second ring-shaped bus-bar portion 200b-1 is arranged in a lay-down position as a single body, and the second extended connecting portions 200b-2 includes four second extended connecting portions 200b-2 extended horizontally from the second ring-shaped bus-bar portion 200b-1 while being spaced apart from one another in the circumferential direction. According to the preferred embodiment, the second bus-bar for pole 200b is arranged lower than the first bus-bar for pole 200a.

The second bus-bar for pole 200b further includes a plurality of second vertical connecting portions 210b. As can be seen in FIG. 6 according to the preferred embodiment, the four second vertical connecting portions 210b are extended vertically from the second extended connecting portions 200b-2 so as to be respectively connected to the four circuit switches.

Figure 7:
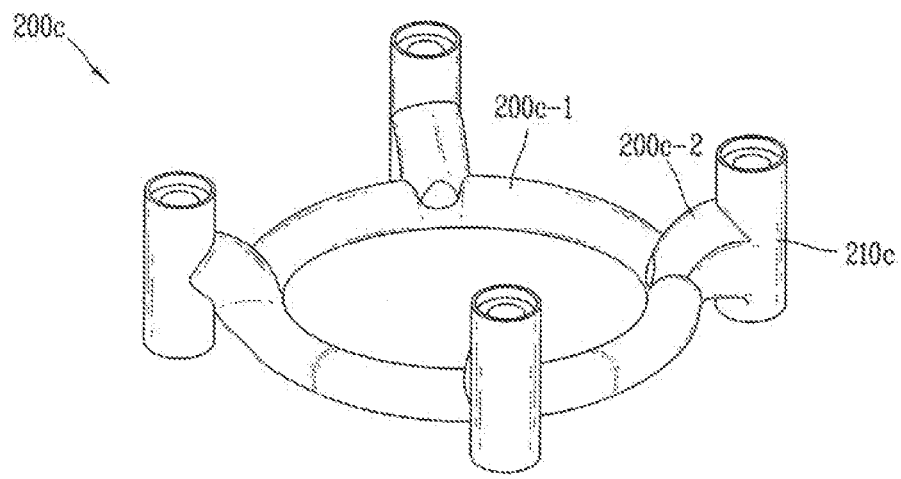
FIG. 7 is a perspective view showing a configuration of a third bus-bar for pole only in the bus-bars for pole of the solid insulated switchgear according to the preferred embodiment of this invention.

The third bus-bar for pole 200c includes a third ring-shaped bus-bar portion 200c-1 and a plurality of third extended connecting portions 200c-2, and provides an conducting path of a third pole of the AC three poles (e.g., a T pole of R, S and T poles). As can be seen in FIG. 7 according to an preferred embodiment, the third ring-shaped bus-bar portion 200c-1 is arranged in a lay-down position as a single body, and the third extended connecting portions 200c-2 includes four third extended connecting portions 200c-2 extended upward from the third ring-shaped bus-bar portion 200c-1 while being spaced apart from one another in the circumferential direction. According to the preferred embodiment, the third bus-bar for pole 200c is arranged lower than the second bus-bar for pole 200b.

The third bus-bar for pole 200c further includes a plurality of third vertical connecting portions 210c. As can be seen in FIG. 7 according to the preferred embodiment, the four third vertical connecting portions 210b are extended vertically from the third extended connecting portions 200c-2 so as to be respectively connected to the four circuit switches.

According to an preferred embodiment, the first, second and third vertical connecting portions 210a, 210b and 210c are arranged so that the heights of their top ends are identical to one another and the heights of their bottom ends are identical to one another. Accordingly, the first, second and third vertical connecting portions 210a, 210b and 210c are suitable to be respectively connected to three arc extinguishing portions for each pole, which are extended in parallel with one another, so that their bottom ends correspond to one another by a predetermined length particularly vertically from the first, second, third and fourth circuit switches 120a, 120b, 120c and 120d.

Figure 9:
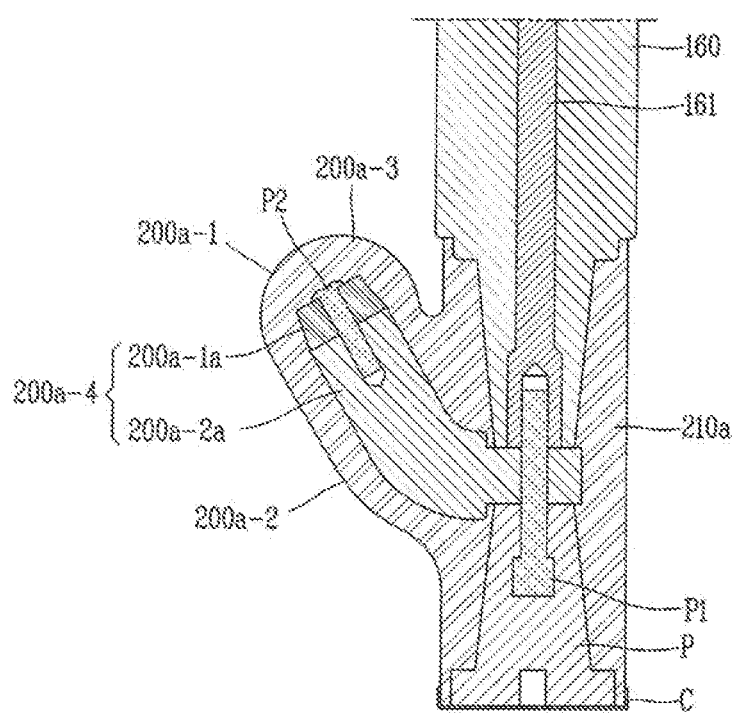
FIG. 9 is a sectional view representatively showing an internal configuration of the first bus-bar for pole in the solid insulated switchgear according to the preferred embodiment of this invention.

Each of the first, second and third bus-bars for pole 200a, 200b and 200c, as representatively shown in the internal structure of the first bus-bar for pole 200a of FIG. 9, has an internal electrical conductor portion 200a-4 and an external solid insulated mold portion 200a-3 in which the electrical conductor portion 200a-4 is built.

The internal structures of the first bus-bar for pole 200a, the second bus-bar for pole 200b and the third bus-bar for pole 200c are identical to one another. Hereinafter, the internal structure of the first bus-bar for pole 200a among the first bus-bar for pole 200a, the second bus-bar for pole 200b and the third bus-bar for pole 200c will be described in detail as a representative example with reference to FIG. 9.

As can be seen in FIG. 9, according to an preferred embodiment, the conductor portion 200a-4 may include a ring-shaped conductor portion 200a-1a and an extending conductor portion 200a-2a, and the ring-shape conductor portion 200a-1a and the extending conductor portion 200a-2a may be connected by a second conductor connection pin P2. Each of the ring-shaped conductor portion 200a-1a and the extending conductor portion 200a-2a has a structure in which its connection portion is divided into both branches, so that the ring-shaped conductor portion 200a-1a and the extending conductor portion 200a-2a are connected by the second conductor connection pin P2.

According to another preferred embodiment, the conductor portion 200a-4 may be integrally formed by welding one ring-shaped conductor portion 200a-1a and four extending conductor portions 200a-2a. In this embodiment, it will be apparent that the connection pin for connecting the ring-shaped conductor portion 200a-1a and the four extending conductor portions 200a-2a and the structure of the connection portion divided into both branches are unnecessary.

The ring-shaped conductor portion 200a-1a is provided to have a ring shape in the inside of the first ring-shaped bus-bar portion 200a-1. The ring-shaped conductor portion 200a-1a may be embedded in the first ring-shaped bus-bar portion 200a-1 by being molded by the mold portion 200a-3 made of a solid insulating material.

The extending conductor portion 200a-2a is diagonally extended downward in the inside of the first extending conductor portion 200a-2 so that the extended end portion is extended up to the inside of the first vertical connection portion 210a. Like the ring-shaped conductor portion 200a-1a, the extending conductor portion 200a-2a may be embedded in the first ring-shaped bus-bar portion 200a-1 by being molded by the mold portion 200a-3 made of the solid insulating material. A through-hole is provided to the extended end portion of the extending conductor portion 200a-2a so that a first conductor connection pin P1 passes through the corresponding through-hole.

As shown in FIG. 9, a conductor portion 161 is embedded in a lower-end portion of the switching mechanism 160, and a lower-end portion of the conductor portion 161 has a structure divided into both branches so as to allow the first connection pin P1 to be inserted thereinto.

The first conductor connection pin P1 passing through the corresponding through-hole is inserted into the conductor portion 161 in the lower-end portion of the switching mechanism 160, so as to connect the extending conductor portion 200a-2a and the conductor portion 161 in the lower-end portion of the switching mechanism 160. Thus, the switching mechanism 160 and the bus-bar for pole 200 can be electrically connected to each other.

As shown in FIG. 9, each of the first, second and third vertical connecting portions 210a, 210b and 210c has a hollow portion vertically formed in the inside thereof. The lower-end portion of each of the first, second and third vertical connecting portions 210a, 210b and 210c is blocked by a packing member P and a cover C, so that it is possible to prevent a foreign matter such as dust from being penetrated into the corresponding vertical connection portion.

Meanwhile, as can be seen in FIG. 2, the plurality of horizontal and vertical support frames 300 and 400 included in the solid insulated switchgear according to the preferred embodiment of the invention are unit that support at least one of the first, second, third and fourth circuit switches 120a, 120b, 120c and 120d.

A support frame supporting at least one of the first, second, third and fourth circuit switches 120a, 120b, 120c and 120d may be completed by selectively assembling four vertical support frames 400 and eight horizontal support frames 300 connecting top and bottom portions of the four vertical support frames 400. Here, the connection between the horizontal and vertical support frames 300 and 400 may be performed by, for example, fastening unit such as bolts and nuts, which are connectable to or separable from each other.

Figure 8:
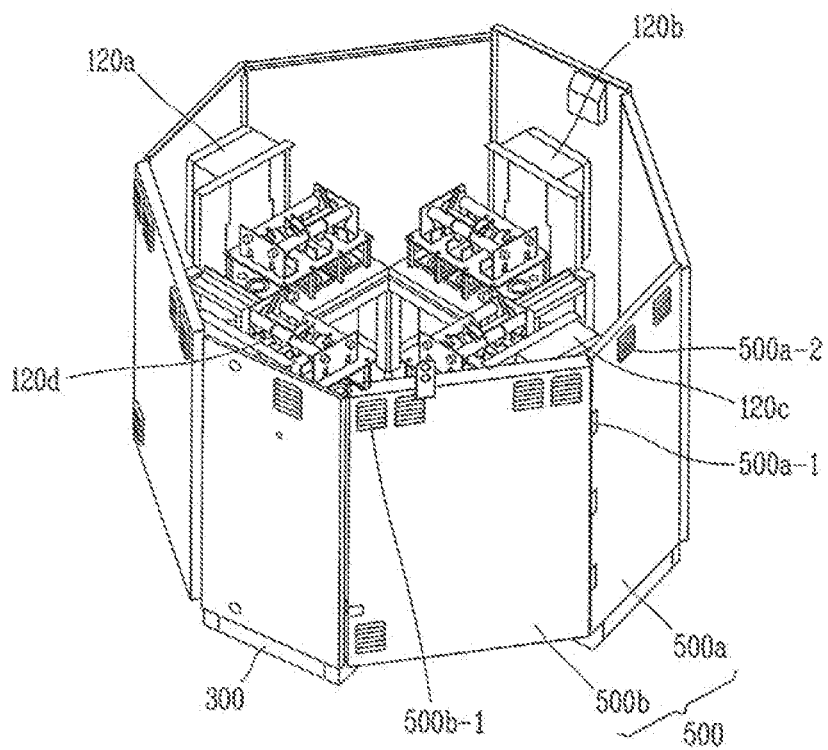
FIG. 8 is a perspective view showing a state in which the solid insulated switchgear is built in the enclosure according to the preferred embodiment of this invention.

Meanwhile, as can be seen in FIG. 8, the solid insulated switchgear according to the preferred embodiment of the present disclosure may further include an enclosure 500 surrounding at least one of the first, second, third and fourth circuit switches 120a, 120b, 120c and 120d and the first, second and third bus-bars for pole 200a, 200b and 200c.

The enclosure 500 may be configured to have a fence shape of which top and bottom portions are opened and closed, respectively. The enclosure 500 includes a plurality of door panels 500a and a plurality of connection panels 500b.

The door panel 500a is arranged at an opening/closing position so as to be rotatably connected by a hinge 500a-1 to any one of the connection panels 500b respectively disposed in front of the first, second, third and fourth circuit switches 120a, 120b, 120c and 120d. Thus, the door panel 500a is opened/closed so that a user can access the circuit switch.

In FIG. 8, the four door panels 500a are arranged to be positioned on four horizontal support frames 300 at bottom front sides among the eight horizontal support frames 300, respectively. According to an preferred embodiment, the door panel 500a may be determined to have a width slightly exceeding the width of the horizontal support frame 300.

Although not shown in FIG. 8, the door panel 500a may have a handle gripped by the user to open/close the door panel 500a, and a locking member movable to a locking or releasing position in conjunction with the handle. At least one door-panel air vent 500a-2 is provided at an upper portion of the door panel 500a, so as to provide a passage through which air having a temperature increased in the enclosure 500 is exhausted to the outside of the enclosure 500 so as to cool down a heating portion of the circuit switch in the enclosure 500.

Four connection panels 500b are provided to be respectively fixed to the door panels 500a according to the configuration of the enclosure 500 according to the preferred embodiment, which is formed in an octagonal shape. The connection panel 500b is connected between a pair of door panels 500a among the four door panels 500a, and supports the door panels 500a at the same time.

At least one connection-panel air vent 500b-1 is provided at upper and lower portions of the connection panel 500b, so that the air having the temperature increased in the enclosure 500 so as to cool down the heating portion of the circuit switch in the enclosure 500 can be exhausted through a connection-panel air vent 500b-1 provided at the upper portion of the connection panel 500b, and external cool air can be flowed into the enclosure 500 through a connection-panel air vent 500b-1 provided at the lower portion of the connection panel 500b.

Hereinafter, the assembling operation of the solid insulated switchgear according to the preferred embodiment configured as described above will be described with reference to FIGS. 2 to 9.

First, in the state in which one of the first, second, third and fourth circuit switches 120a, 120b, 120c and 120d is assembled as shown in FIG. 4, a support frame is configured by assembling the eight horizontal support frames 300 and the four vertical support frames 400 using the fastening unit such as bolts and nuts, and one of the first, second, third and fourth circuit switches 120a, 120b, 120c and 120d, e.g., the first circuit switch 120a is loaded on the corresponding support frame.

Next, as can be seen in FIG. 4, the first, second and third vertical connecting portions 210a, 210b and 210c of the first, second and third bus-bars for pole 200a, 200b and 200c are connected one by one to the lower-end portions of the first switching mechanism 160a in the first circuit switch 120a. The internal state of the first switching mechanism 160a in which the connection has been completed becomes a state shown in FIG. 9.

In case where the solid insulated switchgear according to the preferred embodiment is configured to include only one circuit switch, the assembling of the circuit switch and the bus-bar for pole 200 is completed in this process.

However, in case where the solid insulated switchgear according to the preferred embodiment is configured by assembling four circuit switches and the bus-bar for pole 200, the process of assembling the support frames for supporting the other three circuit switches, i.e., the second, third and fourth circuit switches 120b, 120c and 120d and assembling the second, third and fourth circuit switches 120b, 120c and 120d and the bus-bar for pole 200 is repeatedly performed three times.

That is, in the state in which the second circuit switch 120b is first assembled, a support frame is configured by assembling the eight horizontal support frames 300, one vertical support frame 400 of the previously assembled support frame and newly added three vertical support frames 400 using the fastening members such as bolts and nuts in connection to the previously assembled support frame, and the second circuit switch 120b is loaded on the corresponding support frame.

Next, the first, second and third vertical connecting portions 210a, 210b and 210c of the first, second and third bus-bars for pole 200a, 200b and 200c are connected one by one to the lower-end portions of the second switching mechanism 160b in the second circuit switch 120b. The internal state of the first switching mechanism 160b in which the connection has been completed can be referred to in FIG. 9.

If the loading of the circuit switches and the assembling of the bus-bar for pole 200 are completed in this state, the solid insulated switchgear according to an preferred embodiment may be configured to include a main circuit switch and one branch circuit switch.

On the other hand, in case where the solid insulated switchgear according to an preferred embodiment is configured by assembling the four circuit switches and the bus-bar for pole, the operation of assembling the support frames and the operation of connecting the switching mechanisms of the circuit switches and the vertical connecting portions of the bus-bar for pole 200 are repeatedly performed on the third and fourth circuit switches 120c and 120d, so that the operation of assembling the four circuit switches and the bus-bar for pole 200 and loading the four circuit switches on the support frame is completed. The completed state becomes a state shown in FIG. 2.

In this state, the operation of assembling the enclosure 500 will be described with reference to FIG. 8.

First, one door panel 500a is loaded on the horizontal support frame 300 at a lower front side of any one of the first, second, third and fourth circuit switches 120a, 120b, 120c and 120d, and then connected to the connection panel 500b by the hinge 500a-1.

If the operation is repeatedly performed three times further, the assembling of the octagonal enclosure 500 for the solid insulated switchgear according to the preferred embodiment can be completed.

The solid insulated switchgear according to the preferred embodiment configured as described above includes the first, second and third ring-shaped bus-bar portions 200a-1, 200b-1 and 200c-1 each having the ring-shaped conductor portion 200a-1a as an electrical conductor portion, the extending conductor portion 200a-2a and the solid insulated mold portion 200a-3, and the first, second and third bus-bars for pole 200a, 200b and 200c respectively having the first, second and third extended connecting portions 200a-2, 200b-2 and 200c-2 extended the first, second and third ring-shaped bus-bar portions 200a-1, 200b-1 and 200c-1 while being spaced apart from one another in the circumferential direction so that the first, second, third and fourth circuit switches 120a, 120b, 120c and 120d can be connected in the state in which the first, second, third and fourth circuit switches 120a, 120b, 120c and 120d are separated from one another. Thus, at least one of the first, second, third and fourth circuit switches 120a, 120b, 120c and 120d can be selectively arranged along the circumference of the first, second and third ring-shaped bus-bar portions 200a-1, 200b-1 and 200c-1, so that it is possible to decrease an area occupied in the horizontal direction as compared with a horizontal arrangement structure and to improve the configuration flexibility and use efficiency of the solid insulated switchgear.

In the solid insulated switchgear according to the preferred embodiment, the first, second, third and fourth circuit switches 120a, 120b, 120c and 120d are arranged along the circumference of the first, second and third ring-shaped bus-bar portions 200a-1, 200b-1 and 200c-1 above the first, second and third bus-bar portions 200a, 200b and 200c, so that the entire shape of the solid insulated switchgear is not horizontally long but roughly circular, thereby decreasing an area occupied in the horizontal direction.

In the solid insulated switchgear according to the preferred embodiment, the bus-bar for pole 200 is configured to include the first bus-bar for pole 200a, the second bus-bar for pole 200b arranged lower than the first bus-bar for pole 200a, and the third bus-bar for pole 200c arranged lower than the second bus-bar for pole 200b, so that the three-bus-bars for pole are stacked in the vertical direction, thereby decreasing an area occupied in the horizontal direction.

In the solid insulated switchgear according to the preferred embodiment, each of the first, second and third bus-bar portions 200a, 200b and 200c further includes the plurality of vertical connecting portions, so that the corresponding vertical connection portion is suitable to be connected to the bottom conductor connection portion of the arc extinguishing portion, which is extended particularly vertically from the circuit switch.

In the solid insulated switchgear according to the preferred embodiment, the vertical connecting portions included in the bus-bar for pole 200 are arranged so that the heights of their top ends are identical to one another and the heights of their bottom ends are identical to one another. Accordingly, the corresponding vertical connecting portions are suitable to be respectively connected to the bottom conductor connecting portions of a plurality of arc extinguishing portions, which are extended in parallel with one another, so that their bottom ends correspond to one another by a predetermined length particularly vertically from the circuit switches.

The solid insulated switchgear according to the preferred embodiment further includes the plurality of horizontal and vertical support frames 300 and 400 that are connectable to or separable from one another by the fastening unit so as to support the circuit switches. Thus, at least one of the circuit switches can be supported by the plurality of horizontal and vertical support frames 300 and 400.

In the solid insulated switchgear according to the preferred embodiment, the first, second and third bus-bars for pole 200a, 200b and 200c are arranged to having concentricity, so that the area occupied by the plurality of bus-bars for pole in the horizontal direction can be decreased as compared with a case in which the centers of the plurality of bus-bars for pole do not correspond to one another when the plurality of bus-bars for pole have the same diameter.

The solid insulated switchgear according to the preferred embodiment further includes the enclosure 500 surrounding at least one circuit switch and the plurality of bus-bars for pole 200, so that it is possible to protect the circuit switches and the plurality of bus-bars for pole in the inside of the enclosure 500.

In the solid insulated switchgear according to the preferred embodiment, the enclosure 500 is configured to include the plurality of door panels 500a each arranged at an opening/closing position so as to be rotatably connected by the hinge to any one of the connection panels 500b respectively disposed in front of the circuit switches. Thus, the door panel 500a is opened/closed so that a user can access the circuit switch. Accordingly, the user can access the circuit switch by opening the door panel 500a, and the plurality of door panels 500a can be supported by being connected by the connection panels 500b.

The foregoing embodiments and advantages are merely preferred and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the preferred embodiments described herein may be combined in various ways to obtain additional and/or alternative preferred embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A solid insulated switchgear having at least one circuit switch for opening or closing a three-pole Alternating Current circuits, comprising: a plurality of bus-bars for pole, wherein each of the plurality of bus-bars for the pole being providing correspondingly for each is provided for a respectively corresponding pole and comprises: a plurality of ring-shaped bus-bar portions, each of the plurality of ring-shaped bus-bar portions having an internal electrical conductor portion and an external solid insulated mold portion in which the electrical conductor portion is built, and each of the plurality of ring-shaped bus-bar portions provided correspondingly to each to a respectively corresponding pole of three AC poles; and a plurality of extended connecting portions respectively extended from the ring-shaped bus-bar portion, the plurality of extended connecting portions spaced while being space apart from one another in a circumferential direction such that a plurality of circuit switches are connected in a state in which the plurality of circuit switches are separated from one another.

2. The solid insulated switchgear of claim 1, wherein the plurality of circuit switches are arranged along a circumference of the ring-shaped bus-bar portions above the bus-bar for the pole.

3. The solid insulated switchgear of claim 1, wherein the plurality of bus-bars for the pole comprise:
a first bus-bar for the pole having a first ring-shaped bus-bar portion and a plurality of first extended connecting portions extended downward from the first ring-shaped bus-bar portion and spaced apart from one another in the circumferential direction, and providing a conducting path of a first pole of the AC three poles;
a second bus-bar for the pole having a second ring-shaped bus-bar portion and a plurality of second extended connecting portions extended horizontally from the second ring-shaped bus-bar portion and spaced apart from one another in the circumferential direction, arranged lower than the first bus-bar for the pole, and providing a conducting path of a second pole of the AC three poles; and
a third bus-bar for the pole having a third ring-shaped bus-bar portion and a plurality of third extended connecting portions extended upward from the third ring-shaped bus-bar portion and spaced apart from one another in the circumferential direction, arranged lower than the second bus-bar for the pole, and providing a conducting path of a third pole of the AC three poles.

4. The solid insulated switchgear of claim 3, wherein:
the first bus-bar for the pole further comprises a plurality of first vertical connecting portions extended vertically from the first extended connecting portions so as to be connected to the plurality of circuit switches,
the second bus-bar for the pole further comprises a plurality of second vertical connecting portions extended vertically from the second extended connecting portions so as to be connected to the plurality of circuit switches, and
the third bus-bar for the pole further comprises a plurality of third vertical connecting portions extended vertically from the third extended connecting portions so as to be connected to the plurality of circuit switches.

5. The solid insulated switchgear of claim 4, wherein the first, second and third vertical connecting portions are arranged to have top ends the same height and to have bottom ends having the same height.

6. The solid insulated switchgear of claim 1, further comprising a plurality of horizontal support frames and a plurality of vertical support frames connectable to or separable from each other by a fastening unit so as to support the plurality of circuit switches.

7. The solid insulated switchgear of claim 1, wherein the plurality of bus-bars for the pole are arranged to have concentricity.

8. The solid insulated switchgear of claim 1, further comprising an enclosure surrounding at least one of the plurality of circuit switches and the plurality of bus-bars for the pole.

9. The solid insulated switchgear of claim 8, wherein the enclosure comprises:
a plurality of connection panels of which positions are fixed; and
a plurality of door panels each arranged at an opening/closing position so as to be rotatably connected by a hinge to any one of the plurality of connection panels respectively disposed in front of the plurality of circuit switches such that a corresponding circuit switch is accessed through a corresponding door panel.

10. A solid insulated switchgear having at least one circuit switch comprising a plurality of arc extinguishing mechanisms, each provided for each pole of AC three poles so as to be embedded in a solid insulating material and each having a vacuum interrupter with stationary and movable contacts, a three-pole common actuator providing a driving force so as to open/close the arc extinguishing mechanisms, and a power transmission mechanism transmitting the driving force of the actuator to a movable contact of the arc extinguishing mechanisms, the solid insulated switchgear comprising:
a plurality of bus-bars for pole,
wherein each of the plurality of bus-bars for the pole being providing correspondingly for each is provided for a respectively corresponding pole and comprises:
a plurality of ring-shaped bus-bar portions, each of the plurality of ring-shaped bus-bar portions electrically connecting the arc extinguishing mechanisms for the same pole, and each having an internal electrical conductor portion and an external solid insulated mold portion in which the electrical conductor portion is built; and
a plurality of extended connecting portions respectively extended from the ring-shaped bus-bar portion, the plurality of extended connecting portions spaced while being space apart from one another in a circumferential direction such that the plurality of circuit switches are connected in a state in which the plurality of circuit switches are separated from one another.

11. The solid insulated switchgear of claim 10, wherein the plurality of bus-bars for the pole comprise:
a first bus-bar for the pole having a first ring-shaped bus-bar portion and a plurality of first extended connecting portions extended downward from the first ring-shaped bus-bar portion and spaced apart from one another in the circumferential direction, and providing a conducting path of a first pole of the AC three poles;
a second bus-bar for the pole having a second ring-shaped bus-bar portion and a plurality of second extended connecting portions extended horizontally from the second ring-shaped bus-bar portion and spaced apart from one another in the circumferential direction, arranged lower than the first bus-bar for the pole, and providing a conducting path of a second pole of the AC three poles; and
a third bus-bar for the pole having a third ring-shaped bus-bar portion and a plurality of third extended connecting portions extended upward from the third ring-shaped bus-bar portion and spaced apart from one another in the circumferential direction, arranged lower than the second bus-bar for the pole, and providing a conducting path of a third pole of the AC three poles.

12. The solid insulated switchgear of claim 11, wherein the first bus-bar for the pole further comprises a plurality of first vertical connecting portions extended vertically from the first extended connecting portions so as to be connected to the plurality of circuit switches,
the second bus-bar for the pole further comprises a plurality of second vertical connecting portions extended vertically from the second extended connecting portions so as to be connected to the plurality of circuit switches, and
the third bus-bar for the pole further comprises a plurality of third vertical connecting portions extended vertically from the third extended connecting portions so as to be connected to the plurality of circuit switches.

* * * * *